United States Patent
Kuvikov et al.

(10) Patent No.: US 11,843,530 B2
(45) Date of Patent: Dec. 12, 2023

(54) SYSTEM, METHOD, AND COMPUTER PROGRAM FOR UNOBTRUSIVE PROPAGATION OF SOLUTIONS FOR DETECTED INCIDENTS IN COMPUTER APPLICATIONS

(71) Applicant: Amdocs Development Limited, Limassol (CY)

(72) Inventors: Denis Kuvikov, Beer-Sheva (IL); Andrew Palkin, Ashqelon (IL); Vladimir Tkach, Kfar Yona (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/689,676

(22) Filed: Mar. 8, 2022

(65) Prior Publication Data

US 2023/0291669 A1    Sep. 14, 2023

(51) Int. Cl.
*H04L 12/00* (2006.01)
*H04L 43/0823* (2022.01)
*G06F 16/2457* (2019.01)
*G06F 21/50* (2013.01)
*H04L 9/06* (2006.01)
*H04L 9/00* (2022.01)

(52) U.S. Cl.
CPC .... *H04L 43/0823* (2013.01); *G06F 16/24578* (2019.01); *G06F 21/50* (2013.01); *H04L 9/06* (2013.01); *H04L 9/50* (2022.05)

(58) Field of Classification Search
CPC ......... H04L 43/0823; H04L 9/06; H04L 9/50; G06F 16/24578; G06F 21/50

USPC .................................................. 709/223, 224
See application file for complete search history.

(56) References Cited

U.S. PATENT DOCUMENTS

| | | | | |
|---|---|---|---|---|
| 10,554,687 | B1* | 2/2020 | Satish | H04L 63/1433 |
| 10,796,393 | B2* | 10/2020 | Messerges | G06Q 50/265 |
| 10,803,540 | B2* | 10/2020 | Schuler | G06Q 50/265 |
| 10,878,355 | B2* | 12/2020 | Kleehammer | G06Q 10/06316 |
| 10,904,383 | B1* | 1/2021 | Thornhill | H04M 3/5233 |
| 10,958,419 | B2* | 3/2021 | Schuler | H04L 9/3239 |
| 11,233,693 | B2* | 1/2022 | Misra | H04L 41/145 |
| 11,244,045 | B2* | 2/2022 | Lunsford | G06F 21/577 |
| 11,258,807 | B2* | 2/2022 | Muddu | H04L 43/062 |

(Continued)

OTHER PUBLICATIONS

International Search Report and Written Opinion from PCT Application No. PCT/IB2023/052129, dated Jun. 23, 2023, 12 pages.

*Primary Examiner* — Frantz Coby
(74) *Attorney, Agent, or Firm* — Zilka-Kotab, P.C.

(57) ABSTRACT

As described herein, a system, method, and computer program are provided for unobtrusive propagation of solutions for detected incidents in computer applications. A plurality of incidents detected in association with execution of at least one application are identified, the plurality of incidents being detected for the purpose of being addressed with a solution. The plurality of incidents are aggregated to identify one or more unique incidents. For each unique incident of the one or more unique incidents, at least one of machine learning or natural language processing is used to generate a plurality of ranked solutions for the unique incident, a selection of one solution of the plurality of ranked solutions is received, and the selected solution is deployed to one or more environments on which the unique incident was detected, utilizing a blockchain.

20 Claims, 5 Drawing Sheets

(56) References Cited

U.S. PATENT DOCUMENTS

| | | | |
|---|---|---|---|
| 11,327,826 B1* | 5/2022 | Shama | G06N 20/00 |
| 11,403,393 B1* | 8/2022 | Satish | G06F 21/554 |
| 2017/0154292 A1* | 6/2017 | Venkataraman | G06Q 10/063114 |
| 2018/0260760 A1 | 9/2018 | Srivastava et al. | |
| 2018/0285750 A1 | 10/2018 | Purushothaman et al. | |
| 2018/0285768 A1* | 10/2018 | Karuppasamy | G06N 20/00 |
| 2019/0089577 A1* | 3/2019 | Misra | G06N 20/00 |
| 2020/0127812 A1 | 4/2020 | Schuler et al. | |
| 2020/0293946 A1* | 9/2020 | Sachan | G06N 5/04 |
| 2020/0412599 A1* | 12/2020 | Misra | G06F 11/3447 |
| 2023/0034173 A1* | 2/2023 | Russell | G06N 20/00 |

* cited by examiner

SYSTEM, METHOD, AND COMPUTER PROGRAM FOR UNOBTRUSIVE PROPAGATION OF SOLUTIONS FOR DETECTED INCIDENTS IN COMPUTER APPLICATIONS

FIELD OF THE INVENTION

The present invention relates to issue detection and management in computer systems.

BACKGROUND

When a deployed application is shared by numerous customers (e.g. in separate platform environments), it is common for issues or potential issues within the application to be experienced by most, if not all, of those customers. The issues or potential issues may include incorrect, from the perspective of the customer, incorrect system/platform behavior (e.g. errors, failures, etc.). As a result, issue reporting and detection processes (including remedial action) used to address those (potential) issues will be repeated across the customers. Furthermore, when a similar issue exists across multiple different applications deployed by a single provider, reporting and detection processes may again be repeated among the different quality assurance (QA) teams assigned to work on those applications. Still yet, when a customer tries to report an issue through a reporting application, the customer is typically required to work through a complex workflow that includes a huge number of processes to produce and solve the issue.

To date, platforms used to provide issue detection and management have faced numerous problems, including a lot of duplications, customer confusions, engagement of a lot of teams to solve the same problem in a different provided way, unreasonable use of resources (human resources, electricity, etc.), cleaning duplicates, solving merge issues, deployment issues, etc. There is thus a need for addressing these and/or other issues associated with the prior art.

SUMMARY

As described herein, a system, method, and computer program are provided for unobtrusive propagation of solutions for detected incidents in computer applications. A plurality of incidents detected in association with execution of at least one application are identified, the plurality of incidents being detected for the purpose of being addressed with a solution. The plurality of incidents are aggregated to identify one or more unique incidents. For each unique incident of the one or more unique incidents, at least one of machine learning or natural language processing is used to generate a plurality of ranked solutions for the unique incident, a selection of one solution of the plurality of ranked solutions is received, and the selected solution is deployed to one or more environments on which the unique incident was detected, utilizing a blockchain.

DETAILED DESCRIPTION

Figure 1:
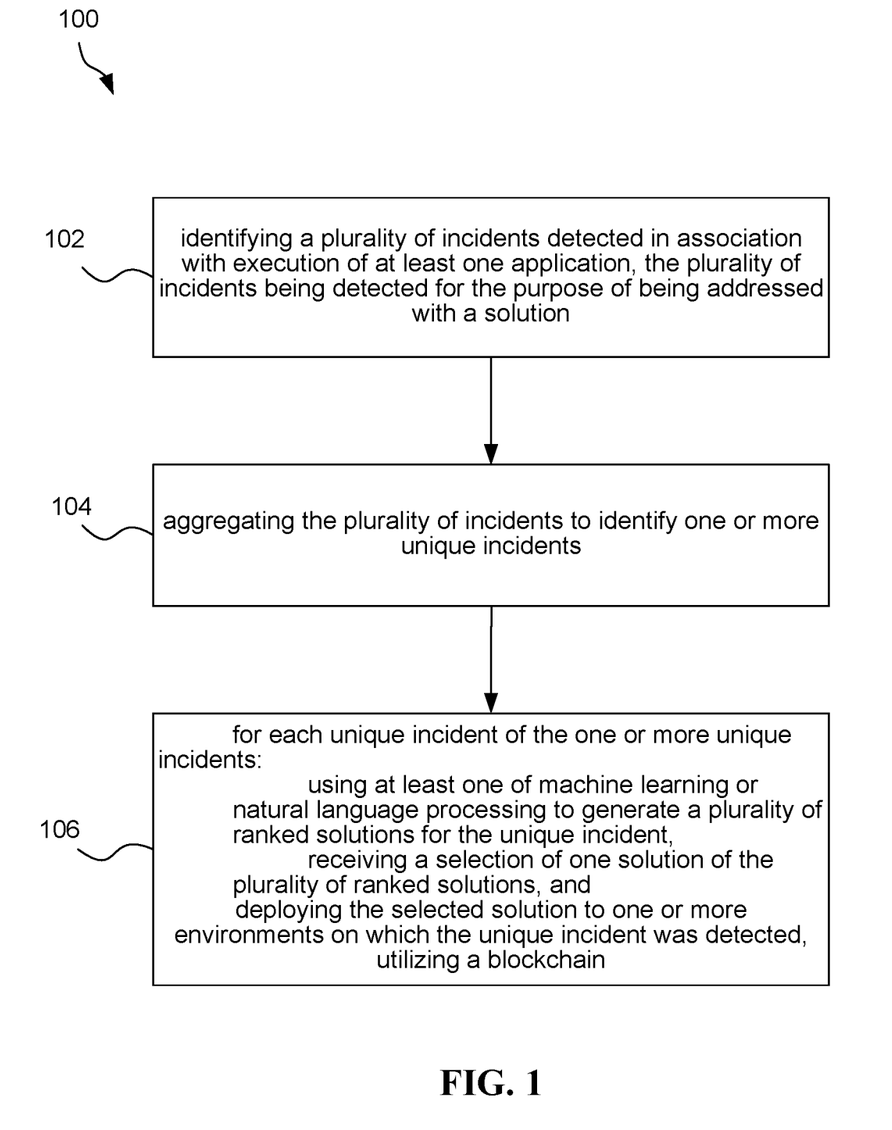
FIG. 1 illustrates a method for deploying solutions to affected environments responsive to detection of incidents associated with applications executing on those environments, in accordance with one embodiment.

FIG. 1 illustrates a method 100 for deploying solutions to affected environments responsive to detection of incidents associated with applications executing on those environments, in accordance with one embodiment. The method 100 may be performed by an incident resolution platform which may include one or more computer systems, such as the computer systems described below with reference to FIGS. 4 and/or 5.

The incident resolution platform may include various hardware and/or software resources which perform the method 100, such as processors, memory, user interfaces, machine learning algorithms, natural language processing algorithms, blockchains, etc., which will be described in more detail below. The incident resolution platform may interface the environments in which the applications execute, which themselves may be located on one or more separate platforms (e.g. of different service providers, etc.). The incident resolution platform may also interface consumer devices for allowing incident reporting to the incident resolution platform. While an incident resolution platform is mentioned as one possible embodiment in which the method 100 may be performed, it should be noted that the method 100 may also be performed by any computer system, such as any of the computer systems described below with reference to FIGS. 4 and/or 5.

In operation 102, a plurality of incidents detected in association with execution of at least one application are identified, the plurality of incidents being detected for the purpose of being addressed with a solution. In the context of the present description, the incidents refer to any events, behavior, features, etc. of the at least one application which are detected for the desired purpose of addressing such incidents with a solution. In one embodiment, the incidents may include behavior observed in association with the execution of the at least one application, which may be deemed to be incorrect, or at least potentially incorrect, by an observer. The behavior may be caused by an error or simply a feature in the at least one application, or even by an underlying computer system executing the at least one application or an underlying environment in which the at least one application executes.

The incidents may be detected in association with a single application, or in association with a plurality of different applications. In one embodiment, the incidents may be detected and reported by a plurality of consumers of the at least one application. In an exemplary embodiment, the at least one application may be deployed in different environments corresponding to the plurality of consumers. In this exemplary embodiment, each consumer may interact with a different instance of, or even a different version of, a same application or with different applications. In any case, a user interface may be provided which allows the consumers to report the detected incidents.

In operation 104, the plurality of incidents are aggregated to identify one or more unique incidents. Aggregating refers to grouping incidents by one or more features. In one embodiment, the incidents may be aggregated based upon an exact match. In another embodiment, the incidents may be aggregated according to a defined similarity.

As noted above, a result of the aggregating is the identification of one or more unique incidents. Each unique incident may represent the incidents included in a particular group of incidents. For example, the one or more unique incidents may include one or more incidents of the plurality of incidents that are common to a particular application of the at least one application. As another example, the one or more unique incidents may include one or more incidents of the plurality of incidents that are common to more than one application of the at least one application. To this end, the incidents identified in operation 102 may be aggregated to remove duplicate (exact or similar) incidents from further processing in operation 106.

In operation 106, for each unique incident of the one or more unique incidents, at least one of machine learning or natural language processing is used to generate a plurality of ranked solutions for the unique incident, a selection of one solution of the plurality of ranked solutions is received, and the selected solution is deployed to one or more environments on which the unique incident was detected, utilizing a blockchain. To this end, a particular solution may be determined once for each unique incident and then deployed to the environments on which the incidents corresponding to that unique incident were detected. The solution may be deployed to the environments in order to resolve any error or feature in the respective application, underlying computer system, or underlying environment which caused the incident.

As noted above, the solution is selected from a plurality of ranked solutions. The solutions include a plurality of possible solutions capable of being deployed to resolve any error or feature which caused the unique incident. The solutions may be ranked (i.e. ordered) based upon any predefined criteria, such as likelihood of being selected to resolve any error or feature which caused the unique incident.

In one embodiment, the ranked solutions may be generated for the unique incident using the machine learning. For example, features of the unique incident may be input to a machine learning model that has been trained to predict solutions capable of being deployed to resolve any error or feature which caused the unique incident as well as to predict a ranking for those solutions. In another embodiment, the ranked solutions may be generated for the unique incident using natural language processing. For example, natural language processing may be applied to the unique incident to extract features, text, etc. from the unique incident that can be matched or otherwise correlated with one or more preconfigured solutions (e.g. based on descriptions of those predefined solutions). The matched/correlated preconfigured solutions may then be ranked based on any desired criteria, such as level of match/correlation.

Further, the selection may be made by an automated process (e.g. according to any predefined criteria or rules), or alternatively may be made by a user. As an option, the selection may affect future solution rankings (i.e. the selected solution may be given a higher ranking in the future).

As also noted above, the selected solution is deployed to the one or more environments on which the unique incident was detected. In one embodiment, this deployment may include validating the selected solution with respect to the one or more environments. For example, the validating may include verifying that the one or more environments contain a vulnerability that is suitably addressed by the selected solution. In one embodiment, machine learning and/or natural language processing may be used for validating the selected solution with respect to the one or more environments. For example, features of the environments on which the unique incident was detected as well as features of the selected solution may be input to a machine learning model trained to predict whether the solution will resolve an existing error or feature within the environments which caused the unique incident. As another example, natural language processing may be applied to the selected solution to extract features, text, etc. from the selected solution that can be matched or otherwise correlated with the environments (e.g. based on descriptions of those environments).

Furthermore, the selected solution is deployed in operation 106 utilizing the blockchain. In one embodiment, at least one transaction may be stored to the blockchain which includes an indication of the selected solution and indication of the one or more environments. For example, a single transaction having an indication of the selected solution and indication of all of the one or more environments may be stored to the blockchain. In another embodiment, a separate transaction per environment of the one or more environments may be stored to the blockchain, with the transaction including an indication of the selected solution and indication of the environment. The one or more environments may then be notified of the at least one transaction stored to the blockchain (e.g. based upon a subscription of those environments to the blockchain). In turn, the one or more environments may be updated with the selected solution responsive to the notification (e.g. by retrieving, downloading, etc. the selected solution from a repository using the indication of the selected solution).

As an option, the deployed solution may be tested. For example, A/B tests, regression tests, performance tests, or any other tests may be performed once the solution has been deployed to the environments. The tests may be run on the environments. As a further option, a result of the testing may affect future solution rankings. For example, if the solution passes the tests then the solution may be ranked higher in the future. If the solution does not pass the tests, then the solution may be ranked lower in the future.

To this end, the method 100 may deploying a solution to affected environments responsive to detection of incidents associated with applications executing on those environments. This method 100 may dramatically reduce a time to detect/deploy/etc. a solution for any incident, may improve cross-team communication due to potentially opened duplicate incidents, and/or may reduce a human factor influence such as when an issue can get stuck in the system for a long time without any human provided solution.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
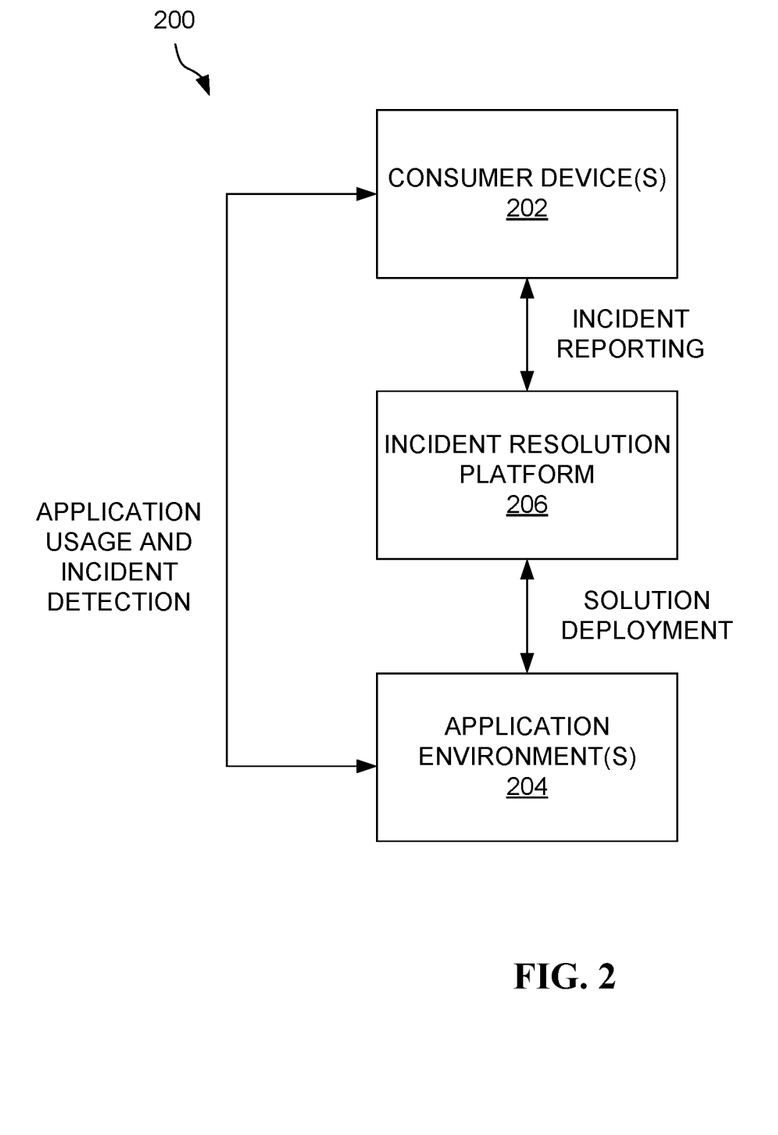
FIG. 2 illustrates a flow diagram of a system for receiving notification of detected incidents and deploying solutions to affected environments, in accordance with one embodiment.

FIG. 2 illustrates a flow diagram of a system 200 for receiving notification of detected incidents and deploying solutions to affected environments, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, one or more consumer devices 202 interface with one or more application environments 204. The consumer devices 202 refer to computer systems capable of being used by consumers to control, manage, use, etc. applications executing within the application environments 204. For example, a different application environment 204 may be provided for use by each consumer 202. The application environments 204 may have instances of the same or different applications executing therein. The application environments 204 may be provided by a single provider or multiple different providers.

The one or more consumer devices 202 also interface an incident resolution platform 206. When users of the consumer devices 202 detect incidents detected in association with execution of the applications, such as by observing at least potentially incorrect behavior associated with the execution of the applications, the users report those incidents to the incident resolution platform 206 (e.g. via a user interface of the incident resolution platform 206). The users report the incidents as a request to have those incidents addressed with a solution.

The incident resolution platform 206 aggregates the incidents received from the consumer devices 202 (e.g. over a defined period of time) to identify one or more unique incidents. For each unique incident, the incident resolution platform 206 uses machine learning and/or natural language processing to generate a plurality of ranked solutions for the unique incident. The incident resolution platform 206 also receives a selection of one solution of the plurality of ranked solutions. The incident resolution platform 206 interfaces the incident resolution platform 206, such that the incident resolution platform 206 is able to deploy the selected solution to the application environments 204 on which the unique incident was detected, utilizing a blockchain.

The blockchain may be provided by the incident resolution platform 206. The blockchain may be managed by a peer-to-peer network collectively adhering to a protocol for inter-node communication and validating new blocks. Once recorded, the data in any given block cannot be altered retroactively without the alteration of all subsequent blocks, which requires consensus of the network majority. The blockchain provides security since, as a peer-to-peer blockchain network (e.g. using public-key cryptography), it lacks a centralized point of vulnerability that computer crackers can exploit, and likewise, it has no central point of failure. The blockchain also provides a notification feature in which code fix entities are used for notifying other entities (e.g. environments) about blockchain transactions they have or data that is being requested.

Figure 3:
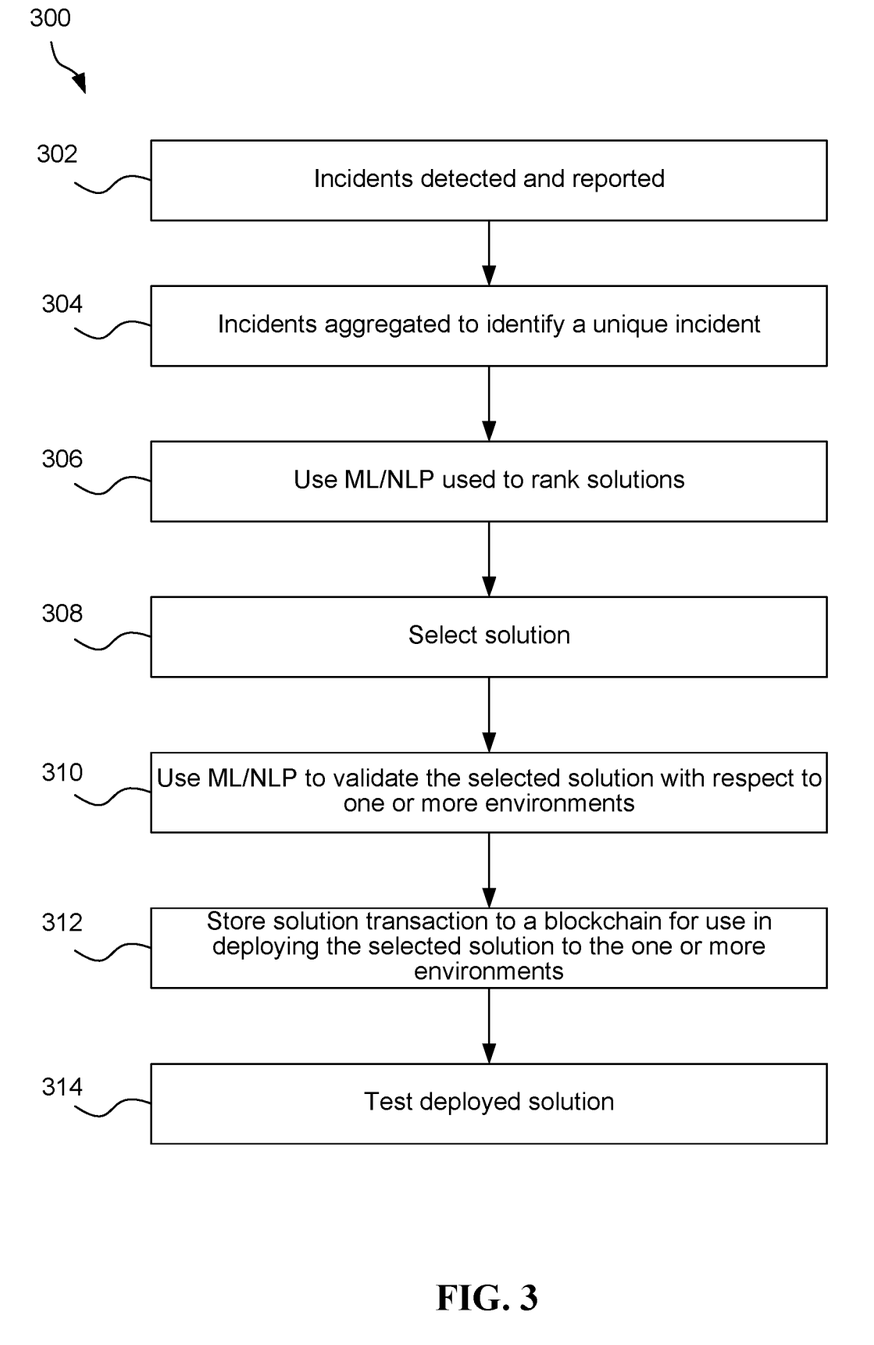
FIG. 3 illustrates a method for unobtrusive propagation of solutions for detected incidents in computer applications, in accordance with one embodiment.

FIG. 3 illustrates a method 300 for unobtrusive propagation of solutions for detected incidents in computer applications, in accordance with one embodiment. As an option, the method 300 may be carried out in the context of the details of the previous figure and/or any subsequent figure(s). For example, the method 300 may be carried out by the incident resolution platform 206 of FIG. 2. Of course, however, the method 300 may be carried out in the context of any desired environment. Further, the aforementioned definitions may equally apply to the description below.

In operation 302, a plurality of incidents are detected in association with execution of at least one application and are reported. In operation 304, the incidents are aggregated to identify a unique incident. In operation 306, machine learning and/or natural language processing (illustrated as "ML/NLP") is used to rank solutions for the unique incident.

In operation 308, a solution is selected from the ranked solutions. In operation 310, ML/NLP is used to validate the selected solution with respect to one or more environments. In operation 312, a solution transaction is stored to a blockchain for use in deploying the selected solution to the one or more environments. In operation 314, the deployed solution is tested.

Figure 4:
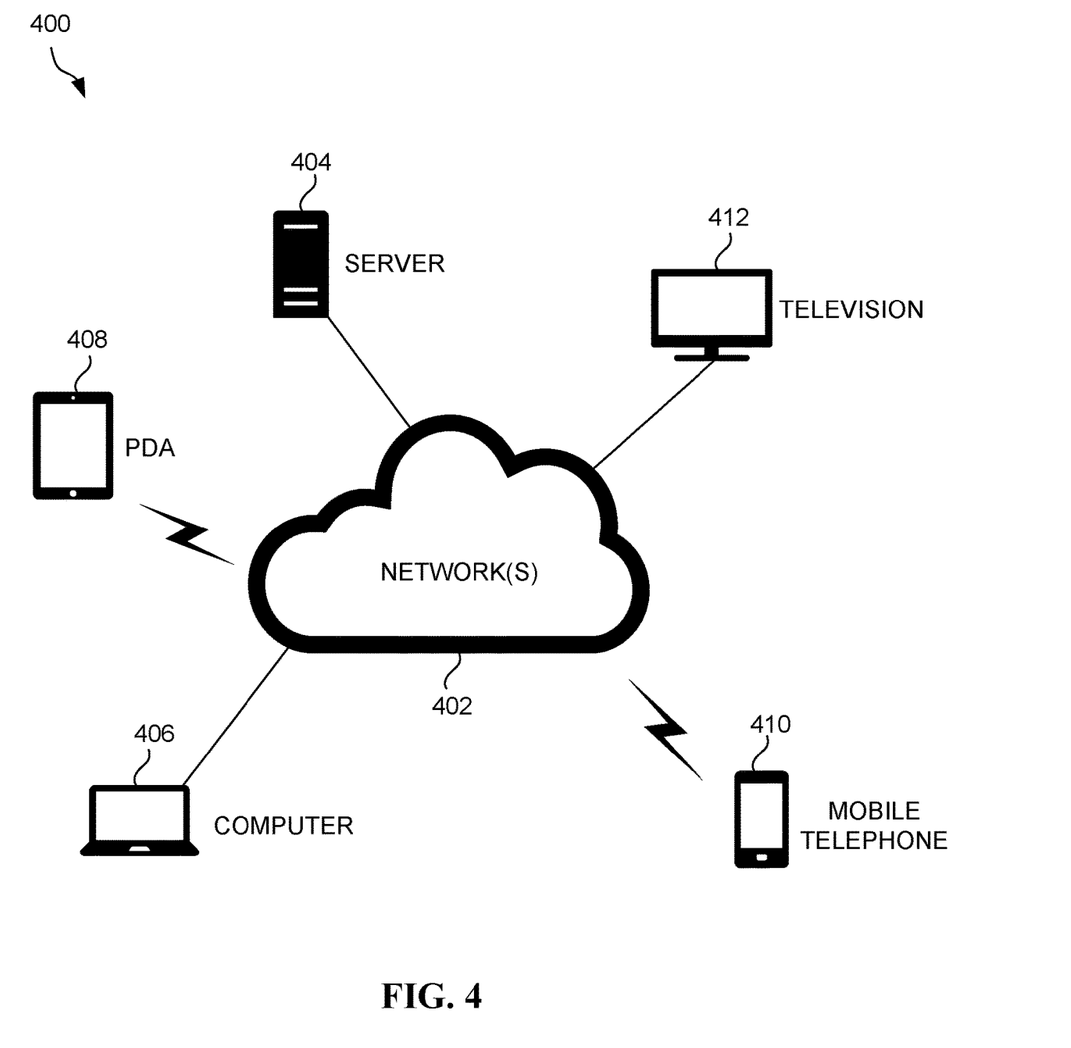
FIG. 4 illustrates a network architecture, in accordance with one possible embodiment.
Figure 5:
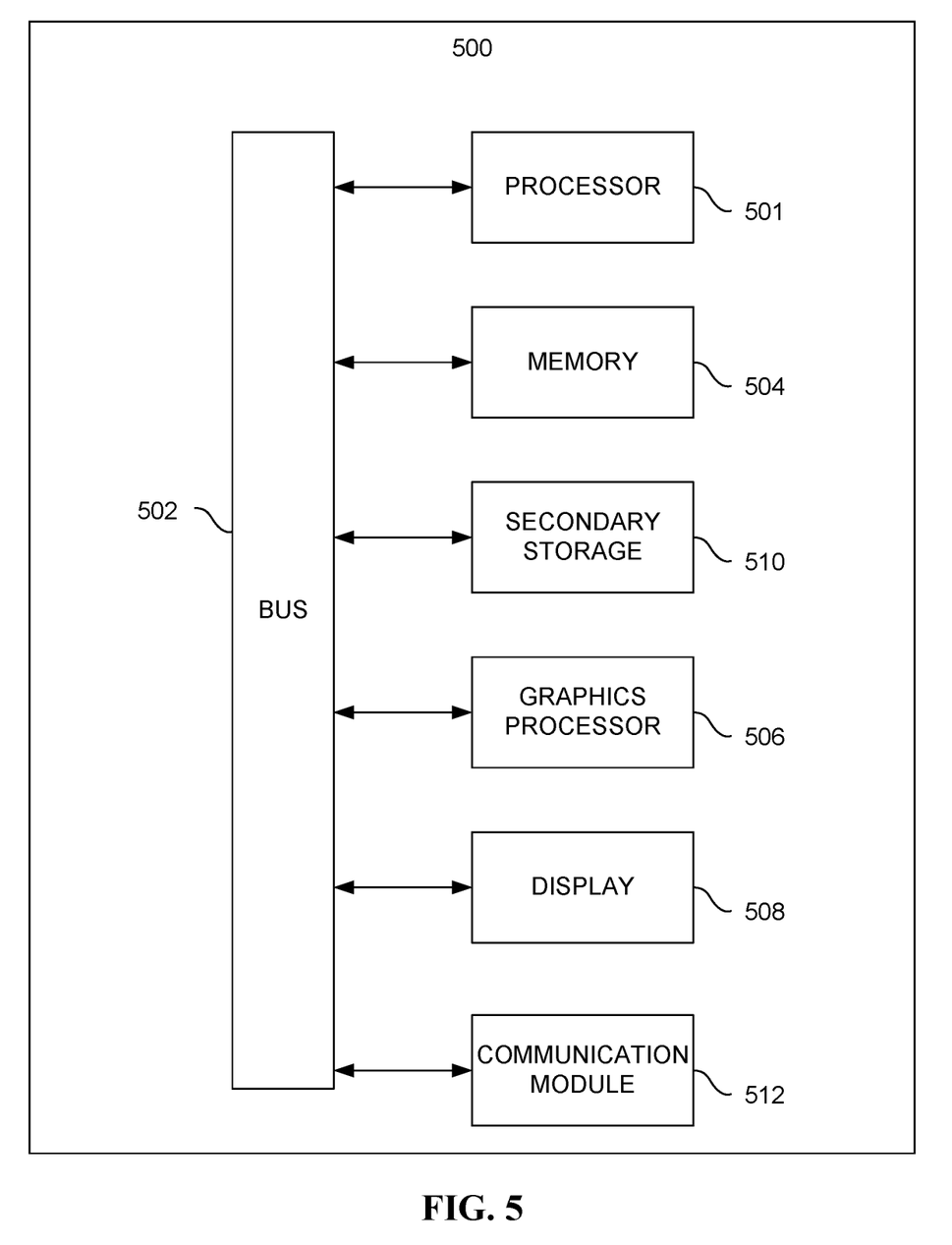
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   identify a plurality of incidents detected in association with execution of at least one application, the plurality of incidents being detected for the purpose of being addressed with a solution,
   wherein the at least one application is deployed in different environments corresponding to a plurality of consumers, and
   wherein the plurality of incidents are detected and reported by the plurality of consumers of the at least one application;
   aggregate the plurality of incidents to identify one or more unique incidents;
   for each unique incident of the one or more unique incidents:

use at least one of machine learning or natural language processing to generate a plurality of ranked solutions for the unique incident,
receive a selection of one solution of the plurality of ranked solutions,
determine one or more environments of the different environments on which the unique incident was detected,
store at least one transaction to the blockchain that includes an indication of the selected solution and an indication of the one or more environments on which the unique incident was detected, and
notify the one or more environments of the at least one transaction stored to the blockchain,
wherein the one or more environments are updated with the selected solution responsive to the notification.

2. The non-transitory computer-readable media of claim 1, wherein the plurality of incidents includes incorrect behavior observed in association with the execution of the at least one application.

3. The non-transitory computer-readable media of claim 1, wherein the one or more unique incidents include one or more incidents of the plurality of incidents that are common to a particular application of the at least one application.

4. The non-transitory computer-readable media of claim 1, wherein the one or more unique incidents include one or more incidents of the plurality of incidents that are common to more than one application of the at least one application.

5. The non-transitory computer-readable media of claim 1, wherein the plurality of ranked solutions for the unique incident are generated using the machine learning.

6. The non-transitory computer-readable media of claim 1, wherein the plurality of ranked solutions for the unique incident are generated using the natural language processing.

7. The non-transitory computer-readable media of claim 1, wherein the selection is made by an automated process.

8. The non-transitory computer-readable media of claim 1, wherein the selection is made by a user.

9. The non-transitory computer-readable media of claim 1, wherein the selection affects future solution rankings.

10. The non-transitory computer-readable media of claim 1, wherein deploying the selected solution to the one or more environments on which the unique incident was detected, utilizing the blockchain, includes:
validating the selected solution with respect to the one or more environments.

11. The non-transitory computer-readable media of claim 10, wherein validating the selected solution includes verifying that the one or more environments contain a vulnerability that is suitably addressed by the selected solution.

12. The non-transitory computer-readable media of claim 11, wherein at least one of machine learning or natural language processing is used for validating the selected solution with respect to the one or more environments.

13. The non-transitory computer-readable media of claim 1, further comprising:
testing the deployed solution;
wherein a result of the testing affects future solution rankings.

14. A method, comprising:
at a computer system:
identifying a plurality of incidents detected in association with execution of at least one application, the plurality of incidents being detected for the purpose of being addressed with a solution,
wherein the at least one application is deployed in different environments corresponding to a plurality of consumers, and
wherein the plurality of incidents are detected and reported by the plurality of consumers of the at least one application;
aggregating the plurality of incidents to identify one or more unique incidents;
for each unique incident of the one or more unique incidents:
using at least one of machine learning or natural language processing to generate a plurality of ranked solutions for the unique incident,
receiving a selection of one solution of the plurality of ranked solutions,
determining one or more environments of the different environments on which the unique incident was detected,
storing at least one transaction to the blockchain that includes an indication of the selected solution and an indication of the one or more environments on which the unique incident was detected, and
notifying the one or more environments of the at least one transaction stored to the blockchain,
wherein the one or more environments are updated with the selected solution responsive to the notification.

15. A system, comprising:
a non-transitory memory storing instructions; and
one or more processors in communication with the non-transitory memory that execute the instructions to:
identify a plurality of incidents detected in association with execution of at least one application, the plurality of incidents being detected for the purpose of being addressed with a solution,
wherein the at least one application is deployed in different environments corresponding to a plurality of consumers, and
wherein the plurality of incidents are detected and reported by the plurality of consumers of the at least one application;
aggregate the plurality of incidents to identify one or more unique incidents;
for each unique incident of the one or more unique incidents:
use at least one of machine learning or natural language processing to generate a plurality of ranked solutions for the unique incident,
receive a selection of one solution of the plurality of ranked solutions,
determine one or more environments of the different environments on which the unique incident was detected,
store at least one transaction to the blockchain that includes an indication of the selected solution and an indication of the one or more environments on which the unique incident was detected, and
notify the one or more environments of the at least one transaction stored to the blockchain,
wherein the one or more environments are updated with the selected solution responsive to the notification.

16. The non-transitory computer-readable media of claim 1, wherein the plurality of incidents are aggregated by grouping the plurality of incidents by one or more features.

17. The non-transitory computer-readable media of claim 16, wherein the plurality of incidents are aggregated based upon an exact match.

18. The non-transitory computer-readable media of claim 16, wherein the plurality of incidents are aggregated according to a defined similarity.

19. The non-transitory computer-readable media of claim 1, wherein the plurality of ranked solutions for the unique incident are possible solutions capable of being deployed to resolve an error or feature which caused the unique incident, and wherein the plurality of ranked solutions are ranked based upon likelihood of being selected to resolve the error or feature which caused the unique incident.

20. The non-transitory computer-readable media of claim 1, wherein the one or more environments are updated with the selected solution responsive to the notification by retrieving the selected solution from a repository using the indication of the selected solution in the at least one transaction stored to the blockchain.

* * * * *